United States Patent [19]

Kuehnle et al.

[11] 4,428,000
[45] Jan. 24, 1984

[54] HIGH SPEED IMAGING OF ELECTROPHOTOGRAPHIC FILM BY FINE BEAM SCANNING

[75] Inventors: Manfred R. Kuehnle, New London, N.H.; Lysle D. Cahill, Dayton, Ohio

[73] Assignee: Coulter Systems Corporation, Bedford, Mass.

[21] Appl. No.: 273,211

[22] Filed: Jun. 12, 1981

Related U.S. Application Data

[63] Continuation of Ser. No. 39,737, May 16, 1979, abandoned, which is a continuation-in-part of Ser. No. 803,575, Jun. 6, 1977, abandoned.

[51] Int. Cl.³ ............................................. H04N 1/30
[52] U.S. Cl. .................................. 358/300; 346/160
[58] Field of Search ............... 346/153, 160; 358/300; 355/3 R, 3 CH; 361/229; 250/324, 325

[56] References Cited

U.S. PATENT DOCUMENTS

| 2,543,051 | 2/1951 | Oughton et al. |
| 2,583,546 | 1/1952 | Carlson. |
| 3,219,755 | 11/1965 | Katagata et al. |
| 3,536,483 | 10/1970 | Watanabe et al. |
| 3,588,911 | 6/1971 | Luke. |
| 4,025,339 | 5/1977 | Kuehule. |

Primary Examiner—Raymond F. Cardillo, Jr.
Attorney, Agent, or Firm—Silverman, Cass & Singer, Ltd.

[57] ABSTRACT

A latent electrostatic image is formed on an electrophotographic member having a crystalline, stable coating of wholly inorganic photoconductive material which is of the order of 0.2 to 2 microns thick. This is effected by moving a corona needle energized by a corona power source and a laser beam modulated from digital information together over the photoconductive coating in a progressive manner at high speed. The latent electrostatic image so formed is then developed.

19 Claims, 1 Drawing Figure

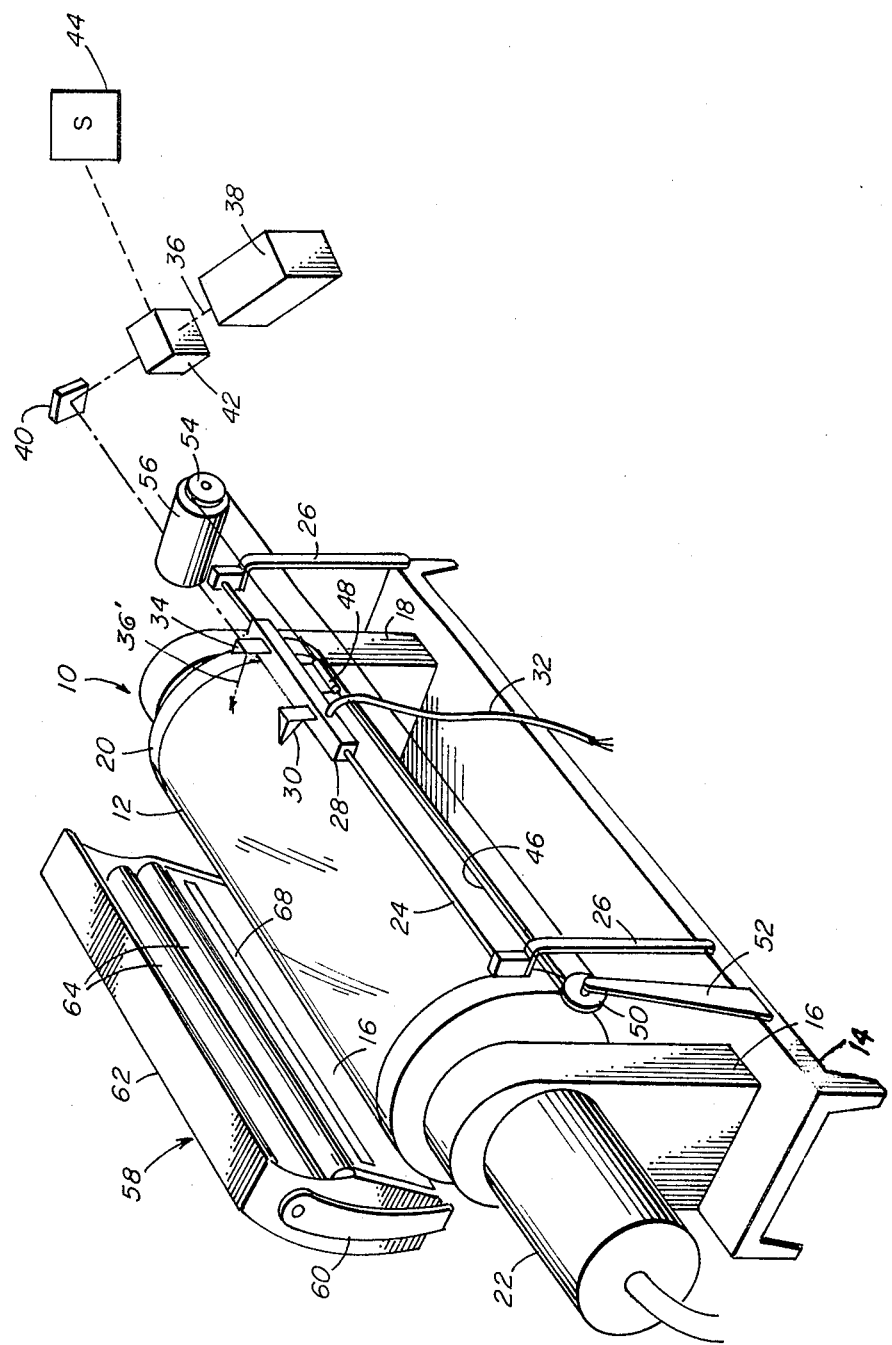

HIGH SPEED IMAGING OF ELECTROPHOTOGRAPHIC FILM BY FINE BEAM SCANNING

CROSS-REFERENCE TO RELATED APPLICATION

This is a continuation of application Ser. No. 39,737, filed May 16, 1979 and now abandoned. Ser. No. 39,737 is a continuation-in-part of Ser. No. 803,575, filed June 6, 1977, now abandoned in favor of Ser. No. 153,869, filed May 27, 1980.

FIELD OF THE INVENTION

The field of the invention is the high speed imaging of electrophotographic film members by a synthesizing process using digital data which has been derived by scanning a master image, computer generated or taken from a terminal input. The imaging is effected by charging the electrophotographic member and "writing" the latent image by scanning technique in which the radiant energy of the modulated laser beam selectively discharges incremental charged areas of the electrophotographic member. Additionally, it is feasible to reformat from an original and produce a different image with the same content, as for example in the case of text. The latent image is achieved through the use of radiant energy beams of very fine diameter. Thereafter the latent image is developed by toning and fixing or by toning, transfer and fixing.

BACKGROUND OF THE INVENTION

The invention will be described as intended for the production of printing plates primarily for lithographic offset or other types of printing, but is not so limited. The application of the invention to printing plate manufacture is advantageous because of the requirement for printing that there be dots or other geometric shapes formed on the plate which will hold or repel ink as in the technique which is familiarly known as ben day screen printing. Obviously, the production of a visible image through the use of dots or the like which are so fine that they cannot be resolved by the naked eye is advantageous for fields other than printing because the data representing an image can be conveniently stored compactly and called up at will.

The electrophotographic member or film of the invention is basically disclosed in U.S. Pat. No. 4,025,339 which is owned by the assignee of this application. The said U.S. Pat. No. 4,025,339 discloses a photoconductive coating which is sputtered onto different types of substrates and which is invested with certain unique porperties and characteristics to be mentioned hereinafter. The scanning of a master image by a laser or fine light beam and its conversion into binary signals for the production of printing through the use of a moving ink jet is disclosed in U.S. Pat. No. 3,604,846 of which one of the applicants herein is a coinventor.

It is believed that the invention herein is unique in that the ability to "write" information for imaging onto an electrophotographic member at extremely high speed and with a resolution that is many orders better than ink jet printing, for example, arises from an unobvious combination. Known commercially available electrostatic media comprising amorphous selenium members and zinc-oxide-resin paper cannot be imaged at high speeds of the order of microseconds at low energy. The electrophotographic member of the invention, besides having many advantages that are not possessed by available electrophotographic materials, can be imaged in nanoseconds which means that the image can be applied at extremely high speed without sacrificing the high resolution capability of the coating. Furthermore, the member can be imaged by techniques not suitable for use with other electrostatic media.

Considering high energy beams of light, as for example, laser beams, the principal problems which have frustrated their use in attempts to image electrophotographic members have been (a) slow speed of available electrophotographic members, (b) light scatter and the low resolution and (c) the inability of known media to discharge completely. In known electrophotographic media, extremely high energy beams would be required to achieve a degree of discharge which can approach absence of charge representing clean background imaging, even if such were possible.

The commercially available paper member which uses zinc-oxide-resin as a photoconductor and the amorphous selenium drum cannot achieve high speed imaging, crisp images, high resolution, complete discharge. In order to be able to do such imaging, the laser beam used would have to have extremely high energy that is likely to burn the material. It is not known that any success has been achieved with these two media, but even complete success would not provide an electrophotographic member that is flexible, archival in quality, robust and tough in construction and capable of being used directly as a printing plate. Certainly, a transparent printing plate could never be produced with prior art of these electrophotographic media.

The photoconductive coating of the invention has such a high quantum gain that in the visible spectrum for the most part the absorption of a single photon will cause the discharge of approximately more than one electron at the blue end of the spectrum and almost one electron in the green-yellow center so that the energy required of a laser beam which is writing on a charged surface is extremely low. The speed of the member is such that it can respond to charge or discharge in nanoseconds, which is a necessity if the imaging is to be done at high speeds. For example, if a large area of an electrophotographic member is required to be imaged as in the manufacture of newspaper printing plates, the difference between about two or three minutes for the invention and an hour at low energy which would be required to image other media is intolerable. Furthermore, if the imaging of other media additionally produces a resolution equivalent to only a few lines per millimeter as compared to from 8 to 16 lines per millimeter achieved in plates of the invention, the use of laser techniques with electrophotography is not justified. In the case of the invention, a cylinder of the electrophotographic material of the invention 15 inches in circumference is capable of being imaged with a resolution of at the minimum 8 lines per millimeter at the rate of about 1 inch per second. It is clear from known information that the equivalent imaging of a zinc oxide or selenium member would require substantially more time and even if successful the resolution could not be achieved which is capable of being achieved with the invention.

Considering the response of the different media to laser beams or fine pencils of light, in the case of the electrophotographic film of the invention complete discharge of the film can be achieved using energies of the order of microwatts. The same size beam for imaging selenium or zinc-oxide-resin must have energies of the order of milliwatts and even watts in some cases placing important and stringent qualifications on the type of laser that can be used. Zinc oxide electrophotographic paper is formed by actually incorporating finely ground particles of zinc oxide in a matrix of organic resin and this material requires as much energy to image as required for many photographic films. At that, this does not produce a transparent member as can be achieved with photographic film.

It is known to image silver photographic film with laser beams. The thickness of the emulsion in photographic film is of the order of fifty times the thickness of the thin film coating of the electrophotographic members of the invention; hence the laser beam scatters internally in photographic film and prevents the achievement of fine resolution. Photographic film is processed chemically and a good deal of its sensitivity is represented by the manner in which it is processed, but its original speed is related to grain size. The faster the film, the larger the grain size. A compromise must be made between the speed of writing the information onto the film and the eventual size of grain. Laser beams are capable of being modulated by acousto-optical devices at very high speeds. For example, laser beams can be turned on and off in 20 nanoseconds. No known commercial photographic film is capable of being imaged at this speed with the same resolution as the invention, and certainly not with a beam that has energy as low as microwatts.

Another aspect of the imaging of photographic film is concerned with resolution, especially where the tones of an image are dependent upon the fidelity of dots and their placement. The particles of silver which are precipitated in the processing of silver halide film grow in a more or less haphazard manner so that the uniform morphology of dots, for example, projected onto the film is not preserved. This affects the crispness and the resolution of images.

The film or member of the invention has a photoconductive coating which is anisotropic optically in that there is no scatter of light when the laser beam strikes the coating, the incident beam penetrating and discharging in a depth less than half a micron. The crystalline structure has internal reflection and does not scatter normally in incident light. The latent image is formed at or on the surface, and subsequent toning responds only to the sharpness of the surface latent image.

With respect to resolution, mention made of 8 to 16 lines per millimeter is a matter of practicality for the manufacture of a printing plate in a short time. The only limiitation to the resolution capability of the film of the invention is the size of the incident radiant energy beam and the size of the smallest information center in the film. With respect to the former, it is not yet feasible to produce beams of light with lasers and the like that are of the same order as the crystallite size of the electrophotographic film of the invention. With toner particles smaller than this size, which is of the order of 700 Angstroms, the theoretical resolution of the film of the invention would be over 10,000 lines per millimeter.

Practical considerations dictate limits at the present time. Diffraction limited lens systems can produce spot sizes of 0.2 micron but a working lens system to approach the realistic maximum resolution is one in which the beam is about 2 microns in diameter. The problem of achieving this is both optical and mechanical. Even at ten times larger spot size than its present feasible potential, such a beam would be useless for imaging selenium and zinc oxide members.

The laying down of a latent image with high resolution is only one criterion of successful imaging. Another which is of importance is the preservation of the image until the electrophotographic member has been developed by toning. In the intervening time, the latent image is capable of being dissipated or dissolved due to migration of charge. In the case of the electrophotographic member of the invention, the coating is electrically anisotropic which is represented by an extremely high resistivity laterally and a low resistivity when discharge occurs transversely, i.e., through the thickness of the photoconductive coating. The surface resistivity is of the order of $1 \times 10^{17}$ ohms per square and higher, it being unlikely that there will be any migration of the charge as there is in the case of selenium and zinc oxide. Selenium owes its usefulness to a very high surface resistivity in darkness, but this is not different from its resistivity transversely so that as soon as an image is formed both resistivities decrease with the result that the charge slowly migrates. There is also a tendency to concentrate the toner where the charge gradient is the greatest, that is, at places where high and low charges exist side by side. Thus, images have a tendency to have their border areas darker than other locations and have the centers of dark areas light instead of solid. This so-called edge effect does not occur in the film of the invention.

Mention made above with respect to total discharge is related to the need for clean backgrounds in the development of images that are composed of dots or other geometric shapes. If there is incomplete discharge as is the case of selenium members, upon toning, the smaller toner particles tend to gather in the areas which are supposed to be colorless and destroy the fidelity of the resulting image. As stated, the member of the invention can be completely discharged so that the background need have no vestigial or remaining charge to attract toner. This is essential where the film is to be used to make a printing plate or, as in the case of the invention, will comprise the printing plate.

The electrophotographic member of the invention has as one of its important attributes the ability to be discharged incrementally so as to achieve varying degrees of surface charge whose potential is proportional to the degree of darkness of the original or master image which was being reproduced. Considerable effort was exerted to utilize this attribute. On this account, it was known that an important factor in achieving an eventual image was the control of toning time to achieve the proper grey scale. Processing was thus considered critical.

According to the invention, grey scale is achieved by the number of dots and for high quality, their placement in a given incremental area with respect to other areas. Each dot is saturated, that is, as black as possible. The processing is not critical. All that is required is to match the toner to the minimum voltage which is achieved during the laser writing. The time required for writing a complete image need only be limited by the voltage chosen as the minimum, this being the dark decay voltage. There are only two types of incremental areas in the latent image, namely those comprising dots whose voltages are above the minimum voltage established for toning and those areas which have no surface potential at all. The dots thus are all saturated and when toned will have an absolute toned value relative to the surround which would normally be dead white (in the case of black and white toning). It has been found that the electrophotographic member of the invention is ideal for this type of imaging since it is capable of being absolutely toned at very low voltages, say of the order of ten volts and less, while also being capable of total discharge in areas alongside of the toned increments.

It will be appreciated that the electrophotographic member of the invention was not originally intended to be used in this manner, i.e., where its superior abilities to exhibit gradients of charge for achieving grey scale are not utilized.

SUMMARY OF THE INVENTION

A method of forming a latent electrostatic image on an electrophotographic member having a photoconductive coating which is microcrystalline, wholly inorganic, optically and electrically anisotropic, having a thickness on the order of 0.2 to 2 microns and having high quantum gain, comprising passing a single corona needle and a spaced modulated beam of radiant energy together over the coating at a high speed. The beam of radiant energy is modulated with digital data to produce discrete dots of discharge or charge at least whose number in a given increment of area determines the grey scale, the dots being laid down with a surface voltage that will tone absolutely in saturation.

The apparatus includes an electrophotographic member of the type described above, a corona needle for charging the member, means for producing a fine beam of radiant energy, means for modulating the fine beam with digital data related to the image to be formed and means for moving the fine beam and corona needle slightly spaced apart, together over the member progressively to produce a latent image in dot or other geometric form.

One of the unique features of this invention is that the electrophotographic member is charged with a single corona needle moving together with the spaced fine beam at a high speed.

Known photoconductors which are chargeable, other than the photoconductive coating of this invention, require intense coronas, that is, coronas sufficient to apply a surface charge of the order of 600 volts. If these photoconductors were to be charged with a single needle, the needle would have to move at a relatively slow speed; consequently, the fine beam would also have to move at a relatively slow speed if it were to maintain a fixed spacing relative to the needle. For example, in order to achieve a charge on selenium or zinc oxide capable of being exposed and imaged, the needle would have to move at a speed of no greater than one inch per second. For this reason, charging has never been accomplished on such media, so far as known, using a single needle moving together with a fine beam.

Charging with a single needle is advantageous because it concentrates the corona and renders it uniform when laid down in overlapping areas. This is especially advantageous for negative photoconductors because negative corona tends to concentrate at imperfections or dust along corona wires and other similar types of corona generating elements. This type of charging is also advantageous since it results in a constant time interval between the charging and exposing over the entire surface of the coating.

Using the electrophotographic member of this invention, charging can be accomplished using a single needle at high speed producing images having high resolution. In particular, using the electrophotographic member of this invention charging can be accomplished with a single corona needle passing over the coating at speeds as high as 80 feet per second and higher. If the film is in a cylindrical formation charging can be achieved at a rate of one axial inch per second or higher.

BRIEF DESCRIPTION OF THE DRAWINGS

The sole FIGURE is a perspective view, more or less diagrammatic in nature, illustrating apparatus for practicing the invention.

DESCRIPTION OF THE PREFERRED EMBODIMENTS

As stated, the invention will be described in connection with the imaging of an electrophotographic member for use in making a printing plate, but it is not so limited. The basic invention is believed to be much broader than that, covering the method and apparatus for achieving imaging by digitally modulating a beam of radiant energy from information or data carried in a store and writing with the beam upon an electrophotographic film or sheet member that has special attributes that work in concert with the beam. The invention revolves around the discovery that the particular electrophotographic member is ideally suited for use with the modulated fine beam when applied in a manner not originally intended. In addition, because of its unique characteristics, the electrophotographic member can be charged at a high speed in a manner with a single corona point source which has never been considered for use with other electrophotographic materials, so far as known.

The requirements for imaging in accordance with the invention to achieve the results of high resolution, extended grey scale and the other benefits which are discussed herein are, first, that the surface potential of the electrophotographic film being imaged is laid down with a point source corona and is required to exceed a certain voltage which may be of the order of 6 to 10 volts; second, that the energy of the fine beam of radiant energy doing the writing must be sufficient to discharge the illuminated charged surface of the electrophotographic film to zero without damaging the film and should leave the non-illuminated parts fully charged; and third, that the toner and the toning process must tone the charged areas absolutely, that is in saturation.

For comment on the above three points, which are not the exhaustive requirements, it should be pointed out that the surface potential of all commercial electrophotographic members other than the one which is the subject matter of the U.S. patent mentioned above when fully charged is in the vicinity of 600 volts, consequently requiring extremely high radiant energy to discharge the same. At that, it is impossible fully to discharge the same. In the case of laser beams, the laser is required to have extremely high energy to produce a fine beam capable of effecting the maximum discharge. In the case of the film of the invention, when fully discharged, the potential of the surface is of the order of 30 volts, and yet the electric field is at least one order greater than the field of the ordinary selenium drum. When charged, the dark decay commences, and after some period of time in the electrophotographic film of the invention may be as low as 6 to 10 volts and still provide sufficient voltage to enable saturation toning. The selenium photoconductors and zinc oxide papers never discharge to the value of 10 volts, always having a residual "noise" voltage which is of the order of 40 or so volts.

With respect to the energy of the beam, since very low energies, of the order of microwatts are sufficient to discharge the film of the invention, small economical lasers can be used and are easily modulated by acousto-optical devices. The type of beam needed to discharge other photoconductive materials or to image silver halide film would be likely to burn holes in the film of the invention.

With respect to toning, the toner is required only to saturate the dots and hence there is no criticality in toning. Time of toning is not related to the grey scale produced.

The electrophotographic member film of the invention is produced by radio frequency sputtering under certain conditions as explained in said U.S. Pat. No. 4,025,339. The transparent film includes a substrate comprising a synthetic resin sheet material of a polyester type such as manufactured by DuPont, Celanese or Kalle as a very stable, transparent, tough, flexible film extruded in various thicknesses. The preferred transparent substrate is of the order of a fraction of a millimeter in thickness. A thin film layer of ohmic material is sputter deposited onto the surface of the substrate, the ohmic layer comprising preferably an alloy of indium oxide and tin oxide in the ratio of about nine to one. The thickness is between about 100 Angstroms and 500 Angstroms to be conductive and yet quite transparent. A bonding layer of a few Angstroms of cadmium sulfide may be sputtered onto the substrate before laying down the ohmic layer. A photoconductive coating or layer having a thickness of the order of 12 to 2 microns is sputter deposited onto the surface of the ohmic layer.

The preferred material for the photoconductive coating is pure cadmium sulfide, which may be selectively doped with copper or carbon or the like to improve the response at the red end of the spectrum. The coating when deposited in the manner detailed in the said U.S. Pat. No. 4,025,339 results in a photoconductor which is made of hexagonal crystallites of cadmium sulfide having very uniform morphology, vertically oriented and displaying single crystal characteristics in testing with electronic beams. There is a very thin barrier layer on the surface which has a surface resistivity of the order of $10^{17}$ to $10^{20}$ ohms per square whether in light or darkness and whether charged or discharged. This comprises the electrical anisotropy. In the bulk and transversely, the resistivity in darkness when charged is of the order of $10^{15}$ ohm centimeters and in light being substantially less in the ratio of about $10^4$. The coating is extremely smooth on its surface and preserves the morphology of toner which is applied and fixed or transferred. It is abrasion-resistant and, since the entire film itself is less than a millimeter thick, the material is highly flexible. It can thus be passed around rollers easily and is not likely to get scratched in passing through machinery.

The photoconductive coating of U.S. Pat. No. 4,025,339 can be sputter deposited onto thin flexible sheet metal such as for example tin plated steel, nickel, aluminum or the like in order to make printing plates based upon metal. Such electrophotographic members are produced without the need for an ohmic layer since the metal substrate provides excellent contact to aid in charging. The added strength of the metal is an advantage in handling the plate. Obviously, such electrophotographic members are not transparent although its photoconductive coating per se is transparent.

The crystalline structure has no internal scattering and hence does not diffuse light which is directed into it normally during writing as happens in the case of all other known electrophotographic members having thicknesses which are very much greater, or, as in the case of photographic films, emulsions which diffuse light.

The electrophotographic film has a quantum gain which is very high, resulting in the production of at least one electron for each absorbed photon thereby providing a very substantial gain mechanism. The member can be charged or discharged at speeds of the order of nanoseconds. The best electrophotographic members known today cannot be charged and discharged at such speeds and still retain the charge if not illuminated for minutes to a degree which still provides sufficient potential for saturation toning.

The high surface resistivity means that there is no loss of charge gradient through migration or edge effect when the surface is toned. Each of the crystallite tips acts as an independent field domain, and since the crystallites are about 700 Angstroms in diameter, the limit of resolution is beyond any known electrophotographic member and depends only upon the size of particles in the toner.

Referring now to the drawing, there is illustrated a device 10 for imaging a cylinder of the electrophotographic member of the invention which is indicated at 12. This can either be a cylinder formed by an enwrapped rectangular electrophotographic member or an integral cylinder thereof. The substrate may be synthetic plastic or metal. The photoconductive coating is applied by sputtering as taught in said U.S. Pat. No. 4,025,339. The device includes a base 14 having end standards 16 and 18 mounting a cylindrical mandrel 20 journalled therein and driven by a high-speed motor 22. A guide or track 24 is mounted parallel with the mandrel 20 upon suitable brackets 26 that are mounted on the base 14. A carriage 28 is mounted for sliding movement along the guide 24. A single corona needle 30 is mounted on the carriage 28 and energized from a suitable corona power source (not shown) through a cable 32. At the end of the carriage 28 opposite the corona needle 30 and spaced a fixed distance therefrom, there is mounted a reflecting prism 34 which is aligned with and receives a beam 36 of light reflected from a laser device 38 by a mirror 40. A laser modulating device 42 of any suitable type such as, for example, an acousto-optic deflector modulator manufactured by Isomet Corporation (U.S.A.) is positioned along the path of beam 36 and serves to modulate beam 36 in accordance with digital data drawn from a store 44. The carriage 28 is connected to one reach of a wire loop 46 by a coupling member 48, the wire loop 46 being engaged over an idler roller 50 carried on a bracket 52 mounted to the base 14 and wrapped around a drive wheel 54 adapted to be rotated by a suitable motor 56.

The entire structure is enclosed in a suitable enclosure which enables the process of charging, writing and toning to be carried on in darkness.

In use, the needle 30 charges the cylinder 12 in a helical path which has the adjacent swaths overlapping to produce a uniform charged area which progresses axially along the cylinder. Immediately thereafter, the reflected beam 36' images the cylinder with the discrete bundles or bursts of photons designed to apply the dots or other geometric shapes of charge or absence of charge in forming the latent image. The ohmic layer of the mounted member 12 is indirectly grounded, or, if the substrate is metal, grounding is direct. The spacing of the needle 30 from the beam 36' is chosen so that a uniform charge will be on the cylinder when the beam 36' is writing. For the speeds mentioned, this can be an inch or two.

In accordance with this invention, the electrophotographic member can be charged and hence imaged at very high speeds. For example, the electrophotographic member can be charged at a speed of about 5,000 linear feet per minute using the single corona needle by providing an electrophotographic member of the type described above in the form of a cylinder having a diameter of about 5½ inches, rotating the cylinder at a speed of 3,600 RPM and making about 60 tracks per inch on the electrophotographic member. This will result in an axial movement of the corona needle of about one inch per second. Such movement is to the left as viewed in the drawing.

After imaging, it is convenient to have a movable toning device 58 which can be swung into position on the arms 60 to apply toner to the latent image. As shown here, the toner device has a hood 62 with several rollers 64, a plate 66 and a slot 68 all of which are the general type of means that can be used to apply liquid toner, remove the excess, bias the liquid to remove extraneous particles of toner, apply rinse, etc. No specific structure is intended to be shown for the toning device 58, and it should also be pointed out that the remainder of the components of the imaging device 10 are illustrated more or less diagrammatically. The parts are obviously required to be constructed to provide for many functions which would be advantageous from an engineering standpoint and to enable convenient use of the invention. For example, the mandrel 20 may be constructed so that it can readily be removed from its journals to enable the sleeve 12 to be mounted thereto and removed therefrom; the guide 24 and its mountings as well as the wire loop 46 should be located so as not to interfere with the attachment and removal of the sleeve 12 and hence may be arranged to be swung into and out of position as mentioned for the toning device 58; controls are required for starting, stopping, and synchronizing the operation of the motors 22 and 56 to integrate with the operation of the entire system, etc.

Likewise, considerable electrical connections and cables are not shown.

After toning and fixing, the latter being readily effected by a simple heating operating, the sleeve 12 can be removed from the apparatus 10, treated to render the image ink-receptive and its background ink-repellant. The resulting article is now capable of being installed in an offset printing press for use as a printing plate.

Variations are capable of being made without departing from the spirit or scope of the invention as embodied in the appended claims.

For example, the electrophotographic member could be on the inside surface of a hollow cylinder and the corona needle and fine beam arranged to rotate and move along the axis of the cylinder. The rotary movement could be achieved by either rotating the cylinder or rotating the needle and deflecting mirror for directing the beam on to the photoconductive surface. Similarly, the axial movement could be achieved by either moving the cylinder axially or the needle and beam reflecting optics, along the axis of the cylinder.

In the claims, reference to "developing" shall be intended to mean deriving the latent imaged information from the electrophotographic member by some method or means including toning, toning and transfer, toning and fixing, reading electronically, etc.

What is desired to secure by Letters Patent of the United States is:

1. A method of dot type imaging electrostatically comprising the steps of providing an electrophotographic member having a sputtered, wholly inorganic microcrystalline photoconductive coating that is of the order of 0.2 to 2 microns thick, which coating has the characteristics of being rapidly chargeable at hhigh speed, fully dischargeable rapidly at incremental portions of the coating on exposure thereof to radiant energy and having dark decay rate such that the charged areas are subject to a rate of dark decay in the nonexposed areas for a duration and at a magnitude sufficient for toning, said coating being both optically and electrically anisotropic; has a surface resistivity of the order of $10^{17}$ ohms per square in light or darkness, a transverse resistivity in darkness when charged of the order of $10^{15}$ ohm centimeters and in light in the ratio of about $10^4$; providing a corona point source and a fine beam source of radiant energy of the order of microwatts in magnitude; charging a limited area of said coating in darkness employing said corona point source; modulating the fine beam of energy in accordance with a predetermined pattern, positioning the modulated fine beam so that it will impact upon the charged surface at a location offset from the area being charged thus exposing the charged limited area of said coating to said modulated fine beam of energy thereby forming an electrostatic latent image of a plurality of fully discharged dot areas and those nonexposed charging areas subject only to dark decay, the charging and exposure steps including the step of moving the corona point source and the fine beam together relative to the photoconductive coating rapidly at a linear speed limited only by the mechanical strength of the components employed to achieve such relative movement and the electrical information capacity of the beam while maintaining a fixed distance between the corona point source and the fine beam, the gray scale of the resulting latent image being determined only by the relative distribution of the resulting fully discharged areas and the dark-decaying charged areas; and developing the latent electrostatic latent image subsequent to completion thereof rendering the same visible.

2. The method of claim 1 and passing the point source and fine beam at a linear speed greater than thirty feet per second during the charging and exposure step.

3. The method of claim 2 and using a single corona needle as the corona point source.

4. The method of claim 1 and using a laser beam as the fine beam.

5. The method of claim 4 and digitally modulating the laser beam.

6. The method of claim 1 and applying the charges until the magnitude thereof is of the order of thirty volts.

7. The method of claim 1 wherein the electrophotographic member is cylindrical, and the step of effecting both rotary and axial movement of the electrophotographic member relative to the point source and the fine beam.

8. The method of claim 1 wherein the electrophotographic member is cylindrical, and the step of rotating the electrophotographic member while simultaneously moving both the point source and fine beam together in a direction axially of and parallel with the longitudinal axis of the electrophotographic member.

9. The method of claim 1 and providing the electrophotographic member in the form of a cylinder, and rotating the cylindrical electrophotographic member at a speed in excess of 1,000 RPM while simultaneously moving both the point source and the fine beam together in a direction axially of and parallel with the longitudinal axis of the electrophotographic member at a speed in excess of one-half an inch per second.

10. The method of claim 1 and moving of the point source and the fine beam together during charging and exposing at a linear speed of the order of eighty feet per second relative to the coating.

11. Apparatus for high speed imaging of an electrophotographic material including a fine beam modulated radiant energy source of the order of microwatts for writing an image on a responsive medium and comprising,
  (a) responsive medium being a wholly inorganic, microcrystalline, electrically and optically anisotropic, sputtered photoconductive coating capable of rapidly accepting a charge and fully discharging said charge at high speed upon exposure to radiant energy, having a surface resistivity of the order of $10^{17}$ ohms per square in light or darkness, transverse resistivity in darkness when charged of the order of $10^{15}$ ohm centimeters and in light, in the ratio of about $10^4$,
  (b) a charging device comprising a point source of corona for charging the coating at a limited area thereof in darkness to a surface potential of a magnitude capable of being fully discharged by the fine beam,
  (c) beam directing means fixedly spaced from said point source for receiving and directing said beam onto said coating in darkness,
  (d) first mounting means carrying both the charging device and the beam directing means in fixed spaced relation,
  (e) second mounting means positioning the electrophotographic member in proximity to said first mounting means,
  (f) drive means for moving said first mounting means relative to the said coating whereby the modulated beam impacts the charged limited area, the impacted area thereof producing a fully discharged dot at the impacted area thereof if the said coating area has previously been charged, a plurality of fully discharged dot areas being formed in the midst of a plurality of charged areas subject only to dark decay representing a latent image, the grey scale of which image being dependent solely upon the overall distribution and proximity of said respective dot areas, and
  (g) means for developing any latent image thus formed to render same visible.

12. The invention as claimed in claim 11 in which said corona point source is a single corona needle.

13. The invention as claimed in claim 11 in which the said first mounting means is located in a leading position relative to the beam directing means.

14. The invention as claimed in claim 11 in which there is a movable carriage, said first mounting means carried by said movable carriage.

15. The invention as claimed in claim 14 in which the first mounting means comprise a support holding said electrophotographic member in a cylindrical configuration and in which said means for effecting relative movement move the carriage axially along the length of the electrophotographic member while at the same time moving the carriage and member rotatively one relative to the other.

16. The invention as claimed in claim 15 in which said moving means are capable of effecting movement of the carriage on a line outside of the cylinder defined by the electrophotographic member, the coating of the member is on the exterior of the cylindrical configuration and the rotative movement is effected by rotating the second mounting means.

17. The invention as claimed in claim 16 in which the electrophotographic member is a complete cylinder.

18. The apparatus of claim 11 and wherein the electrophotographic member is in a cylindrical configuration and the drive means for moving the corona needle relative to the photoconductive coating comprise means for producing rotational movement of the electrophotographic member about its longitudinal axis and means for moving the fine beam and corona needle along the length of the electrophotographic member.

19. Apparatus for forming a tonable latent electrostatic image on an electrophotographic member having a wholly inorganic, microcrystalline, optically and electrically anisotropic, photoconductive coating comprising:
  (a) a charging device for applying a charge to the coating, the charging device having a single corona generating needle,
  (b) means for producing a fine beam of radiant energy of a level capable of fully discharging the charged coating,
  (c) means for modulating the fine beam of radiant energy with data related to the image to be formed,
  (d) means for mounting said corona needle and said fine beam at a fixed spacing therebetween, and
  (e) drive means for moving both the corona needle and the fine beam over the photoconductive coating in concert maintaining the fixed spacing progressively successively to charge and to expose the photoconductive coating to the fine beam, producing thereby a latent image formed of fully discharged dot areas in the midst of uniformly charged areas subject only to dark decay, the relative distribution and proximity thereof determining the grey scale of said image.

* * * * *